US012799431B2

(12) United States Patent
Izmitli et al.

(10) Patent No.: US 12,799,431 B2
(45) Date of Patent: *Nov. 17, 2026

(54) CLEANING BOOSTER

(71) Applicants: Dow Global Technologies LLC, Midland, MI (US); Rohm and Haas Company, Collegeville, PA (US)

(72) Inventors: Aslin Izmitli, Spring City, PA (US); Randara Pulukkody, Lansdale, PA (US); Michael Tulchinsky, Midland, MI (US); Eric Wasserman, Collegeville, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 127 days.

This patent is subject to a terminal disclaimer.

(21) Appl. No.: 18/857,203

(22) PCT Filed: Jun. 14, 2023

(86) PCT No.: PCT/US2023/025235

§ 371 (c)(1),
(2) Date: Oct. 16, 2024

(87) PCT Pub. No.: WO2023/244630

PCT Pub. Date: Dec. 21, 2023

(65) Prior Publication Data

US 2025/0257290 A1 Aug. 14, 2025

Related U.S. Application Data

(60) Provisional application No. 63/353,033, filed on Jun. 17, 2022.

(51) Int. Cl.
*C11D 3/00* (2006.01)
*C11D 3/37* (2006.01)

(52) U.S. Cl.
CPC .................................. *C11D 3/3707* (2013.01)

(58) Field of Classification Search
CPC ... C11D 3/3707; C11D 3/3788; C11D 3/3715; C07D 295/15
USPC .......................................................... 510/531
See application file for complete search history.

(56) References Cited

U.S. PATENT DOCUMENTS

| | | | | |
|---|---|---|---|---|
| 7,884,137 | B2 | 2/2011 | Wang | |
| 2009/0005288 | A1 | 1/2009 | Boutique et al. | |
| 2016/0115144 | A1 * | 4/2016 | Park | C08G 73/0633 544/374 |
| 2019/0390012 | A1 | 12/2019 | Hueffer et al. | |

FOREIGN PATENT DOCUMENTS

| | | |
|---|---|---|
| CA | 2511935 | 1/2006 |
| CN | 111303368 | 6/2020 |
| EP | 0021431 | 1/1981 |
| EP | 3677609 | 7/2020 |
| GB | 2347680 | 9/2000 |

OTHER PUBLICATIONS

STIC Search Report dated Jun. 6, 2026.*
"Tulu, ""Synthesis and properties of hydrophilic polymers. Part 7. Preparation, characterization and metal complexation of carboxy-functional polyesters based on poly(ethylene glycol)"", Polym. Int., 1999, vol. 48, pp. 909-914".

* cited by examiner

*Primary Examiner* — Eisa B Elhilo
(74) *Attorney, Agent, or Firm* — Thomas S. Deibert

(57) ABSTRACT

Cleaning booster for cleaning dirty laundry is provided, wherein the cleaning booster is of formula (I) wherein $E^1$ and $E^2$ are independently selected from a divalent linking group having 1 to 4 carbon atoms; and wherein each $R^1$ is independently of formula (II) wherein the * in formula (II) is the point of attachment to formula (I); wherein each $R^2$ is independently of formula (III) wherein the * in formula (III) is the point of attachment to formula (II); wherein $R^3$ is selected from the group consisting of a hydrogen and a $C_{1-22}$ alkyl group; wherein each $R^4$ and $R^5$ is independently selected from the group consisting of a hydrogen and a $C_{1-2}$ alkyl group, with the proviso that at least one of $R^4$ and $R^5$ is a hydrogen in each subunit c; and wherein c is 0 to 30.

(I)

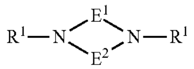

(II)

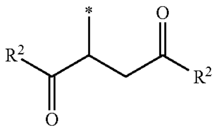

(III)

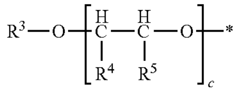

9 Claims, No Drawings

CLEANING BOOSTER

The present invention relates to a cleaning booster for cleaning dirty laundry. In particular, the present invention relates to a cleaning booster for cleaning dirty laundry, wherein the cleaning booster is of formula (I)

(I)

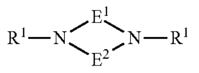

wherein $E^1$ and $E^2$ are independently selected from a divalent linking group having 1 to 4 carbon atoms; and wherein each $R^1$ is independently of formula (II)

(II)

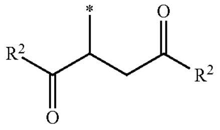

wherein the * in formula (II) is the point of attachment to formula (I); wherein each $R^2$ is independently of formula (III)

(III)

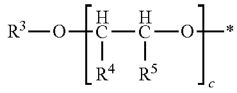

wherein the * in formula (III) is the point of attachment to formula (II); wherein $R^3$ is selected from the group consisting of a hydrogen and a $C_{1-22}$ alkyl group; wherein each $R^4$ and $R^5$ is independently selected from the group consisting of a hydrogen and a $C_{1-2}$ alkyl group, with the proviso that at least one of $R^4$ and $R^5$ is a hydrogen in each subunit c; and wherein c is 0 to 30.

Laundry detergents, particularly those in liquid and gel forms, providing excellent overall cleaning are desirable to consumers. Such laundry detergents typically include surfactants among other components to deliver the consumer desired cleaning benefits. Nevertheless, increasing sensitivity for the environment and rising material costs, a move to reduce the utilization of surfactants in laundry detergents is growing. Consequently, detergent manufactures are seeking ways to reduce the amount of surfactant per unit dose of the laundry detergent while maintaining overall cleaning performance.

One approach for reducing the unit dose of surfactant is to incorporate polymers into the liquid detergent formulations as described by Boutique et al. in U.S. Patent Application Publication No. 20090005288. Boutique et al. disclose a graft copolymer of polyethylene, polypropylene or polybutylene oxide with vinyl acetate in a weight ratio of from about 1:0.2 to about 1:10 for use in liquid or gel laundry detergent formulations having about 2 to about 20 wt % surfactant.

Notwithstanding, there remains a continuing need for cleaning boosters that facilitate maintained primary cleaning performance with reduced surfactant loading laundry detergent formulations (particularly in liquid or gel laundry detergent formulations); preferably, while also providing improved anti-redeposition performance. There is also a continuing need for new cleaning boosters with improved biodegradability according to OECD 301F protocol when compared with conventional cleaning boosters.

The present invention provides a cleaning booster for cleaning dirty laundry, wherein the cleaning booster is of formula (I)

(I)

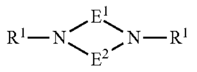

wherein $E^1$ and $E^2$ are independently selected from a divalent linking group having 1 to 4 carbon atoms; and wherein each $R^1$ is independently of formula (II)

(II)

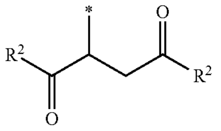

wherein the * in formula (II) is the point of attachment to formula (I); wherein each $R^2$ is independently of formula (III)

(III)

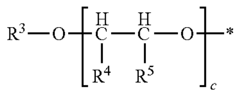

wherein the * in formula (III) is the point of attachment to formula (II); wherein $R^3$ is selected from the group consisting of a hydrogen and a $C_{1-22}$ alkyl group; wherein each $R^4$ and $R^5$ is independently selected from the group consisting of a hydrogen and a $C_{1-2}$ alkyl group, with the proviso that at least one of $R^4$ and $R^5$ is a hydrogen in each subunit c; and wherein c is 0 to 30.

The present invention provides a cleaning booster for cleaning dirty laundry, wherein the cleaning booster is of formula (Ia)

(Ia)

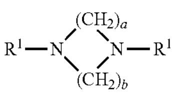

wherein a and b are independently selected from an integer of 1 to 4; and wherein each $R^1$ is independently of formula (II); wherein the * in formula (II) is the point of attachment to formula (Ia); wherein each $R^2$ is independently of formula (III); wherein the * in formula (III) is the point of attachment to formula (II); wherein $R^3$ is selected from the group consisting of a hydrogen and a $C_{1-22}$ alkyl group; wherein each $R^4$ and $R^5$ is independently selected from the group consisting of a hydrogen and a $C_{1-2}$ alkyl group, with the proviso that at least one of $R^4$ and $R^5$ is a hydrogen in each subunit c; and wherein c is 0 to 30.

The present invention provides a cleaning booster for cleaning dirty laundry, wherein the cleaning booster is of formula (Ib)

(Ib)

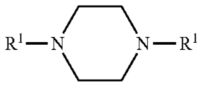

wherein each $R^1$ is independently of formula (II); wherein the * in formula (II) is the point of attachment to formula (Ib); wherein each $R^2$ is independently of formula (III); wherein the * in formula (III) is the point of attachment to formula (II); wherein $R^3$ is selected from the group consisting of a hydrogen and a $C_{1-22}$ alkyl group; wherein each $R^4$ and $R^5$ is independently selected from the group consisting of a hydrogen and a $C_{1-2}$ alkyl group, with the proviso that at least one of $R^4$ and $R^5$ is a hydrogen in each subunit c; and wherein c is 0 to 30.

The present invention provides a laundry additive comprising a mixture of a cleaning booster of the present invention and water.

DETAILED DESCRIPTION

It has been surprisingly found that the cleaning boosters as described herein facilitate improvement in primary cleaning performance for sebum soil removal, while imparting good anti-redeposition performance for dust sebum and clay and also exhibiting desirable biodegradability profiles according to OECD 301F protocol.

Preferably, the cleaning booster for cleaning dirty laundry, of the present invention, is of formula (I) (preferably, wherein formula (I) is selected from the group consisting of formula (Ia) and formula (Ib); more preferably, wherein formula (I) is formula (Ib))

(I)

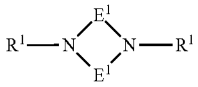

wherein $E^1$ and $E^2$ are independently selected from a divalent linking group having 1 to 4 carbon atoms (preferably, wherein the divalent linking group is a divalent, linear or branched, aliphatic alkyl group having 1 to 4 carbon atoms (preferably, 1 to 3; more preferably, 2); more preferably, wherein the divalent linking group is a divalent, linear aliphatic alkyl group having 1 to 4 carbon atoms (preferably, 1 to 3; more preferably, 2) (preferably, wherein the alkyl group is a hydrocarbon)(preferably, wherein the total number of carbon atoms in $E^1$ and $E^2$ is 2 to 6 (preferably, 2 to 5; more preferably, 3 to 5; most preferably, 4)); and wherein each $R^1$ is independently of formula (II) (i.e., the individual occurrences of $R^1$ in formula (I) can be the same or different from one another)

(II)

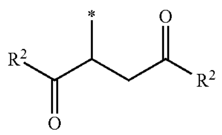

wherein the * in formula (II) is the point of attachment to formula (I); wherein each $R^2$ is independently of formula (III) (i.e., the individual occurrences of $R^2$ in formula (II) can be the same or different from one another);

(III)

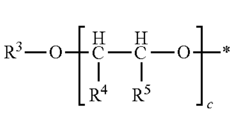

wherein the * in formula (III) is the point of attachment to formula (II); wherein $R^3$ is selected from the group consisting of a hydrogen and a $C_{1-22}$ alkyl group (preferably, a hydrogen and a $C_{1-12}$ alkyl group; more preferably, a hydrogen and a $C_{1-5}$ alkyl group; still more preferably, a hydrogen and a $C_{1-4}$ alkyl group; most preferably, a hydrogen and a $C_4$ alkyl group)); wherein each $R^4$ and $R^5$ is independently selected from the group consisting of a hydrogen and a $C_{1-2}$ alkyl group, with the proviso that at least one of $R^4$ and $R^5$ is a hydrogen in each subunit c; and wherein c is 0 to 30 (preferably, with the proviso that c is 2 to 30 (preferably, 2 to 25; more preferably, 2 to 17; most preferably, 4 to 12) in 70 to 100 mol % (preferably, 80 to 100 mol %; more preferably, 90 to 100 mol %; most preferably, 95 to 100 mol %) of the occurrences of formula (IV) in the cleaning booster).

Preferably, the cleaning booster for cleaning dirty laundry, of the present invention, is of formula (I); wherein formula (I) is selected from the group consisting of formula (La) and formula (Ib) (preferably, formula (Ib))

(Ia)

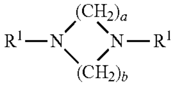

(Ib)

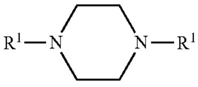

wherein a and b are independently selected from an integer of 1 to 4 (preferably, 2 to 3; more preferably, 2)(preferably, wherein a+b is 2 to 8 (preferably, 2 to 6; more preferably, 3 to 5; most preferably, 4).

Preferably, the cleaning booster for cleaning dirty laundry of the present invention is of formula (I) (preferably, wherein formula (I) is selected from the group consisting of formula (Ia) and formula (Ib) (preferably, formula (Ib)); wherein c is 2 to 30 for an average of 70 to 100 mol % (preferably, 80 to 100 mol %; more preferably, 90 to 100 mol %; most preferably, 95 to 100 mol %) of the $R^2$ groups of formula (II). More preferably, the cleaning booster for cleaning dirty laundry of the present invention is of formula (I) (preferably, wherein formula (I) is selected from the group consisting of formula (Ia) and formula (Ib) (preferably, formula (Ib)); wherein an average of 70 to 100 mol % (preferably, 80 to 100 mol %; more preferably, 90 to 100 mol %; most preferably, 95 to 100 mol %) of the $R^2$ groups of formula (II) are of formula (IIIa)

$$R^6—O—[CH_2CH(R^7)O]_y—* \qquad \text{(IIIa)}$$

wherein the * in formula (IIIa) is the point of attachment to formula (II); wherein $R^6$ is selected from the group consisting of a hydrogen and a $C_{1-22}$ alkyl group (preferably, a hydrogen and a $C_{1-5}$ alkyl group; more preferably, a methyl group, an ethyl group and a butyl group; still more preferably, a methyl group and an n-butyl group; most preferably, an n-butyl group); wherein each $R^7$ is independently selected from the group consisting of a hydrogen and a $C_{1-2}$ alkyl group; and wherein y is 2 to 30. Most preferably, the cleaning booster for cleaning dirty laundry of the present invention is of formula (I) (preferably, wherein formula (I) is selected from the group consisting of formula (Ia) and formula (Ib) (preferably, formula (Ib)); wherein an average of 70 to 100 mol % (preferably, 80 to 100 mol %; more preferably, 90 to 100 mol %; most preferably, 95 to 100 mol %) of the $R^2$ groups of formula (II) are of formula (IIIb)

$$R^8—O-(EO)_h-(PO)_i-(EO)_j-* \quad \text{(IIb)}$$

wherein the * in formula (IIIb) is the point of attachment to formula (II); wherein $R^8$ is selected from the group consisting of a hydrogen and a $C_{1-22}$ alkyl group (preferably, a hydrogen and a $C_{1-5}$ alkyl group; more preferably, a methyl group, an ethyl group and a butyl group; still more preferably, a methyl group and an n-butyl group; most preferably, an n-butyl group); wherein EO is an ethylene oxide group; wherein PO is a propylene oxide group; wherein h is 0 to 30 (preferably, 0 to 1); wherein i is 0 to 30 (preferably, 2 to 5); wherein j is 0 and 30 (preferably, 2 to 6); and wherein h+i+j is 2 to 30 (preferably, 4 to 12).

Preferably, the laundry additive of the present invention comprises a mixture of a cleaning booster of the present invention and water. More preferably, the laundry additive of the present invention is a mixture comprising 0.1 to 99 wt % (preferably, 0.2 to 98 wt %; more preferably, 0.5 to 95 wt %; most preferably, 0.75 to 90 wt %), based on weight of the laundry additive, of a cleaning booster of the present invention; and 1 to 99.9 wt % (preferably, 2 to 99.8 wt %; more preferably, 5 to 99.5 wt %; most preferably, 10 to 99.25 wt %), based on weight of the laundry additive, of a water. Most preferably, the laundry additive of the present invention is a mixture comprising 0.1 to 99 wt % (preferably, 0.2 to 98 wt %; more preferably, 0.5 to 95 wt %; most preferably, 0.75 to 90 wt %), based on weight of the laundry additive, of a cleaning booster of the present invention; and 1 to 99.9 wt % (preferably, 2 to 99.8 wt %; more preferably, 5 to 99.5 wt %; most preferably, 10 to 99.25 wt %), based on weight of the laundry additive, of a water; wherein the laundry additive is a liquid (preferably, wherein the laundry additive is a liquid at 21 °C and 1 standard atmosphere of pressure).

Some embodiments of the present invention will now be described in detail in the following Examples.

Synthesis S1: Michael Addition of piperazine and Dimethyl Maleate

A 250 mL 3-necked glass round bottom flask equipped with a magnetic stir bar was charged with piperazine (2.314 g, 26.6 mmol, from Sigma Aldrich≥99%) and ethanol (92 mL). Gentle mixing was initiated, and the flask was equipped with a cold-water condenser connected to an oil bubbler. The condenser was sealed to the center neck with silicone grease and the flask was further sealed with 2 rubber septa. The flask was then cooled by submerging in an ice water bath to absorb the heat of reaction. A thermocouple was inserted into one septum to track temperature during reaction. To the contents of the flask was slowly added dimethyl maleate (7.835 g, 52.7 mmol, from TCI America>97%) via mechanically metered syringe pump over 30 minutes. A minor exotherm was observed during the addition of dimethyl maleate and precipitate begins to form halfway through addition. Once the temperature had stopped increasing, the flask was then placed on a reaction block heater and stirred at 60 °C for 3 hours. After 1 hour of heating, the precipitate dissolved but after an additional hour of heating crystals began to fall out of solution. When the reaction had cooled, the crystallization rate increased. The crystals were collected 24 hours later via vacuum filtration. The isolated and air-dried crystals were determined to be the disubstituted adduct via $^1H$ and $^{13}C$ NMR and were used without further purification. $^1H$ NMR (500 MHz, $CDCl_3$) δ 3.68 (d, J=2.0 Hz, 7H), 3.63 (d, J=1.6 Hz, 6H), 2.87-2.72 (m, 2H), 2.71-2.51 (m, 6H), 2.45 (dt, J=11.0, 5.6 Hz, 4H), 1.29-1.16 (m, 1H); $^{13}C$ NMR (500 MHz, $CDCl_3$) δ 171.7 (2C), 171.0 (2C), 63.4 (2C), 51.8 (2C), 51.5 (2C), 50.0 (4C), 34.0 (2C).

Synthesis S2: Michael Addition of piperazine and Dimethyl Maleate

A 500 mL 3-necked glass round bottom flask equipped with a magnetic stir bar was charged with piperazine (9.2768 g, 106.6 mmol, from Sigma Aldrich≥99%) and ethanol (329.8 mL). Gentle mixing was initiated, and the flask was equipped with a cold-water condenser connected to an oil bubbler. The condenser was sealed to the center neck with silicone grease and the flask was further sealed with 2 rubber septa. The flask was then cooled by submerging in an ice water bath to absorb the heat of reaction. A needle-style thermocouple probe was was used to record temperature. Mixing was initiated and dimethyl maleate (31.623 g, 212.8 mmol, 2.0 eq., from TCI America>97%) was then delivered via syringe pump over 1 hour (0.45 ml/min) to control the heat generated from the exothermic reaction. When dimethyl maleate addition was complete, the flask was allowed to hold for 5 minutes before transferring flask to an Opti-THERM® Reaction Block attached to an IKA magnetic stirring/heating plate with a target temperature of 60 °C. The reaction was held with constant mixing at an internal temperature of 56-64 °C for 3.5 hours. At the end of the reaction hold, the flask was slowly cooled to room temperature to encourage precipitation of the product. The precipitated product is collected via vacuum filtration on a Whatman filter paper fixed inside a Buchner funnel. The product is then dried overnight in a vacuum oven at 60 °C to yield 10 grams of white fluffy powder. A second crop of crystals was obtained by freeze thaw cycles and by increasing the concentration via rotary distillation. The second crop was dried similarly to yield 4.4 grams. Each crop of crystals was confirmed via NMR to be the fully disubstituted product. $^{13}C$ NMR (126 MHz, $CDCl_3$) δ 171.77, 171.04, 63.45, 51.72 (d, J=29.5 Hz), 49.96, 34.06.

Syntheses S3-S5: Preparation of alkoxylate Polymers

In Syntheses S3-S5, alkoxylate polymers according to the formula $CH_3O-(EO)_m(PO)_n—H$ having values of m and n as noted in TABLE 1 were prepared in a Symyx Parallel Pressure Reactor (PPR®) with a glass insert and equipped with removable polyether ether ketone (PEEK) paddle for mechanical stirring. Both the glass insert and the removable PEEK stir paddle was dried in a vacuum oven at 125 °C overnight prior to the reaction. An ethoxylated intermediate of type $CH_3O-(EO)_m—H$ was prepared by ethoxylation of 2-methoxyethanol (from Sigma-Aldrich). A stock solution was prepared by dissolving in 2-methoxyethanol, under nitrogen, an amount of potassium hydride of about 3 wt % based on weight of the 2-methoxyethanol. Then a calculated amount of the stock solution was added to the glass insert under nitrogen. The glass insert was then loaded into a reactor, followed by attachment of the stirring paddle.

The reactor was then sealed, heated to 120 °C, and pressurized with nitrogen to 345 kPa. Ethylene oxide was then delivered to the reactor in several injections via an Isco syringe pump equipped with a robotically controlled needle and compressed gas micro-valve connected to the reactor. The overall amount of ethylene oxide added to the reactor was calculated to provide the desired length of the $(EO)_n$ block assuming complete consumption of the ethylene oxide added to the reactor. After addition of the ethylene oxide, the temperature was maintained at 120 °C and the reaction mixture was stirred for 4 hours. The reactor contents were then cooled. The reactor was vented and purged with nitrogen to remove any residual ethylene oxide.

The reactor was then heated to 50 °C and pressurized with nitrogen to a pressure of 345 kPa. Propylene oxide was then charged to the reactor via an Isco syringe pump. The amount of propylene oxide added to the reactor was calculated to correspond to the desired length of the $(PO)_n$ block of the targeted material assuming complete consumption of the propylene oxide added to the reactor. After addition of the propylene oxide, the temperature was increased to 115 °C and maintained at that temperature while the contents of the reactor were stirred for 20 hours. The reactor contents were then cooled. The reactor was vented and purged with nitrogen to remove any residual ethylene oxide. The product from the reactor was used without further purification. The molecular weight of the product collected was determined by GPC and the composition was determined by quantitative $^{13}C$ NMR as reported in Table 1.

TABLE 1

| | Calculated | | $^{13}C$ NMR | | GPC | | |
|---|---|---|---|---|---|---|---|
| Ex. | m | n | m | n | Mn | Mw | PDI |
| S3 | 2.1 | 2.9 | 2.4 | 3.1 | 466 | 499 | 1.07 |
| S4 | 18.9 | 6.7 | 17.6 | 6.9 | 1,395 | 1,568 | 1.12 |
| S5 | 2.7 | 12.1 | 3.2 | 11.4 | 1,065 | 1,154 | 1.08 |

Example 1: Preparation of Cleaning Booster

In Example 1, a transesterification product of the following general formula

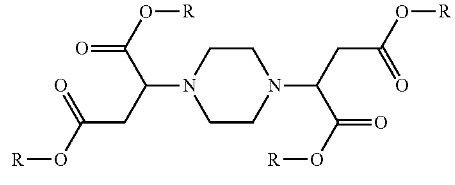

was prepared by charging an alkoxylate polymer (R—OH) (6.1112 g, 11.8 mmol, 4.4 eq., from The Dow Chemical Company as UCON™ 50-HB-100), material prepared according to Synthesis S1 (1.0004 g, 2.7 mmol) and titanium isopropoxide (0.108 g, 0.38 mmol, 14.1 mol %, from Sigma Aldrich 99.999%) to a 50 mL Airfree® Kjeldahl flask with a magnetic stir bar. The flask was sealed with a septum with a needle probe thermocouple inserted, attached to a Schlenk line, and then heated in an OptiTHERM® Reaction Block attached to an IKA magnetic heating plate with a set point temperature of 120 °C while under a nitrogen blanket. After 19 minutes, the temperature reached 116.9 °C and the sample turned from a hazy slurry to a clear solution. After an additional hour, the temperature reached 117.0 °C and vacuum was applied to the flask contents via a mechanical pump with an intervening solvent trap housed inside a dewar flask and submerged in a bed of dry ice. The mixing speed was adjusted between 300-450 rpm throughout course of reaction. The flask contents were held at a temperature of 116.6-120.8 °C for 12.5 hours under vacuum. The flask contents were then cooled and characterized by NMR to confirm completion of the reaction. Based on the ratio of total carbonyl carbon integral (peaks at 170.7, 170.4, 169.6 ppm) to that of the residual methyl ester carbon peak at 51 ppm of ~10:1, the extent of conversion of methyl ester is estimated to be about 90%.

Examples 2-3: Preparation of Cleaning Booster

In Examples 2-3, a transesterification product of the following general formula

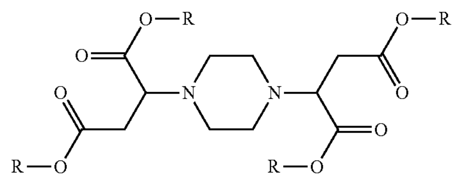

was prepared by charging an alkoxylate polymer (R—OH) of the type and in the amount noted in Table 2, material prepared according to Synthesis S2 in the amount noted in Table 2 to a 50 mL Chemglass Airfree® round bottom Kjeldahl flask equipped with a magnetic stir bar. The flask was sealed with a septum and then heated with gentle mixing in an OptiTHERM® Reaction Block attached to an IKA magnetic heating plate with a set point of 120 °C A needle-type thermocouple was inserted through the septum to record internal temperature. After 2 hours of mixing and heating, vacuum was applied via mechanical pump with intervening solvent trap cooled by a dry ice/isopropanol slurry for 10 minutes and the flask is refilled with nitrogen. With an internal temperature of 115 °C, titanium isopropoxide in the amount noted in Table 2 was injected. The flask was then heated and stirred with a set point of 120 °C and 500 rpm. After 2 hours, the flask was exposed to intermittent vacuum and allowed to react for an additional 2.5 hours. The flask was cooled and the product collected.

TABLE 2

| Reagent | | Example 2 | Example 3 |
|---|---|---|---|
| alkoxylate polymer | Synthesis S3 | 3.5246 | 0 |
| | Synthesis S4 | 0 | 3.6280 |
| Synthesis S2 | | 1.0328 | 0.2816 |
| Titanium isopropoxide | | 0.115 | 0.041 |

Example 4: Preparation of Cleaning Booster

In Example 4, a transesterification product of the following general formula

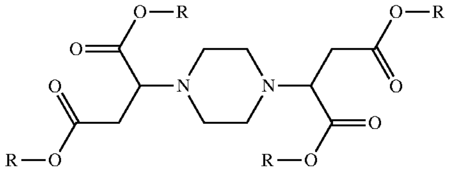

was prepared by charging the alkoxylate polymer of Synthesis S5 (R—OH) (3.6609 g, 5.53 mmol, 4.8 eq.) and the intermediate of Synthesis S2 (0.4372 g, 1.16 mmol) were charged to a 250 mL Chemglass Airfree® flask equipped with a magnetic stir bar. The flask was sealed with a septum and then heated with gentle mixing in an OptiTHERM® Reaction Block attached to an IKA magnetic heating plate with a set point of 120 °C. A needle-type thermocouple was inserted through the septum to record internal temperature. After 40 minutes of mixing and heating, vacuum was applied via mechanical pump with intervening solvent trap cooled by a dry ice/isopropanol slurry for 30 minutes and the flask is refilled with nitrogen. With an internal temperature of 115 °C, titanium isopropoxide (0.070 g, 0.25 mmol, 21 mol %, from Sigma Aldrich 99.999%) was injected. The flask was then heated and stirred with a set point of 120 °C and 700 rpm. After 1.5 hours, the flask was exposed to metered vacuum and allowed to react for an additional 2 hours with a final reduced pressure of 85 Torr. The flask was cooled, and a sample is taken for NMR. Additional titanium isopropoxide (0.039 g, 0.14 mmol, 12 mol % was injected at room temperature after 2 cycles of vacuum and nitrogen refilling. The flask was reheated to 120 °C and held at 700 rpm. After 4 hours of heating and mixing, a vacuum was applied for 1.5 hours with a final reduced pressure of 0.1 Torr. The flask was then cooled and another sample is taken for NMR. Titanium isopropoxide (0.039 g, 0.14 mmol, 12 mol %) was once again injected at room temperature after 2 cycles of vacuum and nitrogen refilling. The flask was reheated to 120 °C and held at 700 rpm. After 3 hours of heating, the flask was exposed to metered vacuum with a setpoint of 150 Torr for 2.5 hours and then unmetered vacuum for 30 minutes with a final reduced pressure of 0.1 Torr. The flask was then cooled and another sample was taken for NMR. $^{13}C$ NMR revealed 88% conversion of methyl esters. $^{13}C$ NMR (126 MHz, $CDCl_3$) δ 170.50, 169.66, 76.15-74.13 (m), 73.26 (q, J=2.9 Hz), 73.09-72.43 (m), 71.85 (d, J=6.3 Hz), 70.80-70.12 (m), 69.91 (d, J=34.6 Hz), 68.69-67.45 (m), 67.06 (d, J=8.5 Hz), 63.41, 58.90 (d, J=2.0 Hz), 49.76, 34.74, 21.77 (d, J=17.7 Hz), 18.56-17.73 (m), 17.69-16.38 (m).

Comparative Examples CF1-CF2 and Example F1: Liquid Laundry Detergent

The liquid laundry detergent formulations used in the cleaning tests in the subsequent Examples were prepared having the generic formulation as described in Table 3 with the cleaning booster as noted in Table 4 neutralized to a pH of 8.5 were prepared by standard liquid laundry formulation preparation procedures.

TABLE 3

| Ingredient | Commercial Name | wt % |
|---|---|---|
| Linear alkyl benzene sulfonate | Nacconal 90G* | 12.0 |
| Sodium lauryl ethoxysulfate | Steol CS-460* | 3.0 |
| Propylene glycol | — | 3.0 |
| Ethanol | — | 1.2 |
| Sodium citrate | — | 1.0 |
| Sodium xylenesulfonate | Stepanate SXS-93 | 3.3 |
| Fatty acid | Prifac 7908[a] | 1.8 |
| Cleaning Booster | — | 5.0 |
| Deionized water | — | QS to 100 |

*from Stepan Company
[a]from Croda

TABLE 4

| Example | Cleaning Booster |
|---|---|
| Comparative Example CF1 | Alcohol ethoxylate[1] |
| Comparative Example CF2 | Ethoxylated poly(ethyleneimine)[2] |
| Example F1 | Example 1 |

[1]from Stepan Company under the tradename BIO-SOFT ® N25-9
[2]from BASF under tradename SOKOLAN ™ HP-20

Primary Cleaning Performance

The primary cleaning performance of the liquid laundry detergent formulations of Comparative Examples CF1-CF2 and Example F1 were assessed in a Launder-Ometer (SDL Atlas, Model M228AA) at a set test temperature of 22 °C using an 18 minute wash cycle. Twenty of the 1.2 liter canisters were filled with 500 mL of hardness adjusted water at 100 ppm by mass with 2:1 $Ca^{2+}$:$Mg^{2+}$ molar ratio were used for each run. The washed fabrics were rinsed in 300 mL of 100 ppm (2/1 $Ca^{2+}/Mg^{2+}$) hardness adjusted water at ambient temperature for 5 minutes at 260 osc/min pm on an Eberbach E6000 reciprocal shaker. The stained fabrics and soiled ballasts used in the tests were PCS-S-132 high discriminative sebum BEY pigment and PCS-S-94 sebum/dust ASTM stains from Testfabrics stitched to a pre-shrunk cotton interlock fabric. The size of the cotton interlock was 5×5 cm. The stained swatches were 2.5×3 cm. One 5×5 cm cut SBL-CFT soil ballast was added to each canister to provide baseline soil to the wash solution. The total surfactant concentration in the wash liquor was 200 ppm.

Reflectance Measurement and Stain Removal Index (SRI)

The soil removal index (SRI) for each of the Liquid Laundry Detergent formulations evaluated in Primary Cleaning Performance Test were determined using ASTM Method D4265-14. The average SRI taken from 8 swatches per condition (two swatches per pot, 4 pots) is provided in Table 5.

The L*, a* and b* values of the stained fabrics were measured pre and post wash with a Mach 5 spectrophotometer from Colour Consult. The L*, a* and b* values for the unwashed, unstained polycotton fabric was measured in the SRI calculations as follows:

$$SRI = \frac{(\Delta E^*_{(US-UF)} - \Delta E^*_{(WS-UF)})}{\Delta E^*_{(US-UF)}} \times 100$$

wherein US is the unwashed stain area, UF is the unwashed (unstained) fabric area, WS is the washed stain area, ΔE*

$_{(US\text{-}UF)}$ is the ΔE* color difference between the unwashed stain and the unwashed fabric and $\Delta E^*_{(WS\text{-}UF)}$ is the ΔE* color difference between the washed stain and the unwashed fabric. The value of ΔE* is calculated as $$\Delta E^* = (\Delta L^* + \Delta a^{*2} + \Delta b^{*2})^{1/2}$$

The ΔSRI values provided in TABLE 5 give the difference between the SRI measured for the noted example relative to the SRI measured for Comparative Example CF1. A positive value indicates an increase in soil removal relative to Comparative Example CF1.

TABLE 5

| Example | Cleaning Booster | ΔSRI PCS-94 | ΔSRI PCS-132 |
|---|---|---|---|
| Comparative Example CF2 | Ethoxylated poly(ethyleneimine)[1] | −0.6 | −3.2 |
| Example F1 | Example 1 | 0.75 | 3.91 |

[1]from BASF under tradename SOKOLAN ™ HP-20

Comparative Examples CF3-CF4 and Example F2: Liquid Laundry Detergent

The liquid laundry detergent formulation used in the cleaning tests in the subsequent Examples was prepared by combining 0.5 g of a standard liquid laundry detergent formulation with an adjusted pH of 8.5 as described in TABLE 6 with 1.5 g of a 1 w % aqueous solution of the cleaning booster noted in TABLE 7.

TABLE 6

| Ingredient | Commercial Name | wt % |
|---|---|---|
| Linear alkyl benzene sulfonate | Nacconal 90G* | 12 |
| Sodium lauryl ethoxysulfate | Steol CS-460* | 2 |
| Propylene glycol | — | 3.5 |
| Ethanol | — | 1.5 |
| Deionized water | — | QS to 100 |

*from Stepan Company
[a] from The Dow Chemical Company

TABLE 7

| Example | Cleaning Booster |
|---|---|
| Comparative Example CF3 | None |
| Comparative Example CF4 | Ethoxylated poly(ethyleneimine)[1] |
| Example F2 | Example 1 |

[1]from BASF under tradename SOKOLAN ™ HP-20

Anti-Redeposition

The anti-redeposition performance of the combination of the standard liquid laundry detergent+cleaning booster of Comparative Examples CF3-CF4 and Example F2 was assessed in a Terg-o-tometer Model 7243ES agitated at 90 cycles per minute with the conditions noted in TABLE 8.

TABLE 8

| Parameter | Setting |
|---|---|
| Temperature | 50° C. |
| Water hardness | 300 ppm, $Ca^{2+}/Mg^{2+}$ = 2/1 |
| Fabric Types | Cotton (C)<br>Cotton interlock (CI)<br>Cotton Terry (CT)<br>Polyester: cotton blend (PB)<br>Polyester knit (PK)<br>Polyester woven (PW)<br>two cloths of each type in each pot |
| Wash time | 60 minutes |
| Rinse time | 3 minutes |
| Liquid laundry detergent dosage | 0.5 g |
| Cleaning booster | 1.5 g of 1 wt % aqueous solution |
| Anti-redeposition soils | 2.5 g/L dust sebum<br>0.63 g/L Redart clay |
| Drying | After final rinse, fabrics were dried in a food dehydrator at 50° C. for 2 hours |

The antiredeposition performance was determined by calculating the ΔE measured with a MACH 5+ instrument (L, a & b). The results are noted in TABLE 9, wherein ΔE* is according to the equation $$\Delta E^* = AE_{aw} - AE_{bw}$$

wherein $\Delta E_{aw}$ is measured from fabrics after washing, and $\Delta E_{bw}$ is measured from fabrics before washing. A higher ΔE* corresponds with better antiredeposition performance.

TABLE 9

| Example | Cleaning Booster | ΔE* C | CI | CT | PB | PK | PW |
|---|---|---|---|---|---|---|---|
| Comp. Ex. CF3 | None | 13.16 | 20.79 | 21.38 | 13.61 | 25.31 | 17.20 |
| Comp. Ex. CF4 | Ethoxylated poly(ethyleneimine)[1] | 9.49 | 13.48 | 12.86 | 8.46 | 19.67 | 12.33 |
| Example F2 | Example 1 | 8.47 | 14.59 | 14.28 | 12.89 | 25.25 | 15.73 |

[1]from BASF under tradename SOKOLAN ™ HP-20

Comparative Examples CF5-CF6 and Examples F3-F5: Unit Dose Laundry Detergent Unit dose laundry detergent formulations of Comparative Examples CF5-CF6 and Examples F3-F5 used in the subsequent cleaning tests were prepared having the generic formulation as described in TABLE 10 with the cleaning booster as noted in TABLE 11 neutralized to a pH of 8.5 were prepared by standard laundry formulation preparation procedures.

TABLE 10

| Ingredient | Commercial Name | wt % |
|---|---|---|
| 4-Dodecylbenzenesulfonic acid | Product No. 44198[a] | 30 |
| Sodium lauryl ethoxysulfate | Steol CS-460[b] | 10 |
| Propylene glycol | — | 19 |
| Monoethanolamine | Monoethanolamine (MEA)[c] | 8 |
| Glycerin | — | 19 |
| Oleic acid | — | 3 |
| Cleaning booster | — | 5 |
| Deionized water | — | QS to 100 |

TABLE 10-continued

| Ingredient | Commercial Name | wt % |
|---|---|---|

[a]from Sigma Aldrich
[b]from Stepan Company
[c]from The Dow Chemical Company

TABLE 11

| Example | Cleaning Booster |
|---|---|
| Comparative Example CF5 | Alcohol ethoxylate[1] |
| Comparative Example CF6 | Ethoxylated poly(ethyleneimine)[2] |
| Example F3 | Example 2 |
| Example F4 | Example 3 |
| Example F5 | Example 4 |

[1]from Stepan Company under the tradename BIO-SOFT ® N25-9
[2]from BASF under tradename SOKOLAN ™ HP-20

Primary Cleaning Performance

The primary cleaning performance of the unit dose formulations of Comparative Examples CF5-CF6 and Examples F3-F6 was assessed in a Terg-O-Tometer Model 7243ES with cannisters (2 L) agitated at 85 cycles per minute with the conditions noted in Table 12.

TABLE 12

| Parameter | Setting |
|---|---|
| Temperature | 30° C. |
| Water hardness | 120 ppm, $Ca^{2+}/Mg^{2+}$ = 3/1 |
| Water volume | 1 L per cannister |
| Fabric/Soil | 2 inch × 2 inch square cut PC-S-94 dust sebum swatches from Testfabrics |
| Wash time | 30 minutes |
| Rinse time | 3 minutes |
| detergent dosage | 0.3 g/L |
| Drying | After final rinse, fabrics were dried in a food dehydrator at 50° C. for 2 hours |

Reflectance Measurement and Stain Removal Index (SRI)

The soil removal index (SRI) for each of the Liquid Laundry Detergent formulations evaluated in Primary Cleaning Performance Test were determined using ASTM Method D4265-14. The average SRI taken from 8 swatches per condition (two swatches per pot, 4 pots) is provided in Table 13.

The L*, a* and b* values of the stained fabrics were measured pre and post wash with a Mach 5 spectrophotometer from Colour Consult. The L*, a* and b* values for the unwashed, unstained fabric was measured in the SRI calculations as follows:

$$SRI = \frac{(\Delta E^*_{(US-UF)} - \Delta E^*_{(WS-UF)})}{\Delta E^*_{(US-UF)}} \times 100$$

wherein US is the unwashed stain area, UF is the unwashed (unstained) fabric area, WS is the washed stain area, $\Delta E^*_{(US-UF)}$ is the ΔE* color difference between the unwashed stain and the unwashed fabric and $\Delta E^*_{(WS-UF)}$ is the ΔE* color difference between the washed stain and the unwashed fabric. The value of ΔE* is calculated as $$\Delta E^* = (\Delta L^* + \Delta a^{*2} + \Delta b^{*2})^{1/2}$$

TABLE 13

| Example | Cleaning Booster | ΔSRI PCS-94 |
|---|---|---|
| Comparative Example CF5 | Alcohol ethoxylate[1] | 30.9 |
| Comparative Example CF6 | Ethoxylated poly(ethyleneimine)[2] | 28.8 |
| Example F3 | Example 2 | 37.0 |
| Example F4 | Example 3 | 40.5 |
| Example F5 | Example 4 | 41.6 |

[1]from Stepan Company under tradename BIO-SOFT ® N25-9
[2]from BASF under tradename SOKOLAN ™ HP-20

We claim:

1. A cleaning booster for cleaning dirty laundry, wherein the cleaning booster is of formula (I)

(I)

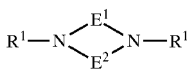

wherein $E^1$ and $E^2$ are independently selected from a divalent linking group having 1 to 4 carbon atoms; and wherein each $R^1$ is independently of formula (II)

(II)

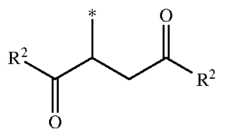

wherein the * in formula (II) is the point of attachment to formula (I); wherein each $R^2$ is independently of formula (III)

(III)

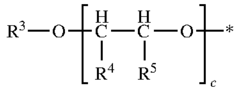

wherein the * in formula (III) is the point of attachment to formula (II); wherein $R^3$ is selected from the group consisting of a hydrogen and a $C_{1-22}$ alkyl group; wherein each $R^4$ and $R^5$ is independently selected from the group consisting of a hydrogen and a $C_{1-2}$ alkyl group, with the proviso that at least one of $R^4$ and $R^5$ is a hydrogen in each subunit c; and wherein c is 2 to 30 in 70 to 100 mol % of the occurrences of $R^2$ in the cleaning booster.

2. The cleaning booster of claim 1, wherein $E^1$ and $E^2$ are independently selected from a divalent, linear or branched, aliphatic alkyl group having 1 to 4 carbon atoms.

3. The cleaning booster of claim 2, wherein the cleaning booster of formula (I) is of formula (Ia)

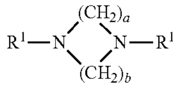

(Ia)

wherein a and b are independently selected from an integer of 1 to 4.

4. The cleaning booster of claim 3, wherein a+b is 2 to 6.

5. The cleaning booster of claim 4, wherein 70 to 100 mol % of the $R^2$ groups in the cleaning booster are of formula (IIIa)

$$R^6—O—[CH_2CH(R^7)O]_y—*$$ (IIIa)

wherein the * in formula (IIIa) is the point of attachment to formula (II); wherein $R^6$ is selected from the group consisting of a hydrogen and a $C_{1-22}$ alkyl group; wherein each $R^7$ is independently selected from the group consisting of a hydrogen and a $C_{1-2}$ alkyl group; and wherein y is 2 to 30.

6. The cleaning booster of claim 5, wherein 70 to 100 mol % of the $R^2$ groups in the cleaning booster are of formula (IIIb)

$$R^8—O\text{-}(EO)_h\text{-}(PO)_i\text{-}(EO)_j\text{-}*$$ (IIIb)

wherein the * in formula (IIIb) is the point of attachment to formula (II); wherein $R^8$ is selected from the group consisting of a hydrogen and a $C_{1-12}$ alkyl group; wherein EO is an ethylene oxide group; wherein PO is a propylene oxide group; wherein h is 0 to 30; wherein i is 0 to 30;

wherein j is 0 and 30; and wherein h+i+j is 2 to 30.

7. The cleaning booster of claim 6, wherein the cleaning booster of formula (I) is of formula (Ib)

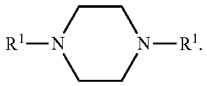

(Ib)

8. A laundry additive comprising a mixture of a cleaning booster of claim 1 and water.

9. The laundry additive of claim 8, wherein the laundry additive is a liquid.

* * * * *